C. Warner,

Pipe Coupling.

Nº 7,332.    Patented Apr. 30, 1850.

UNITED STATES PATENT OFFICE.

CHAPMAN WARNER, OF LOUISVILLE, KENTUCKY.

PIPE-COUPLING.

Specification of Letters Patent No. 7,332, dated April 30, 1850.

*To all whom it may concern:*

Be it known that I, CHAPMAN WARNER, of Louisville, in the county of Jefferson and State of Kentucky, have invented a new and Improved Pipe-Fastening, of which the following is a full, clear, and exact description, reference being had to the accompanying drawing, forming part of this specification, in which—

Figure 1:
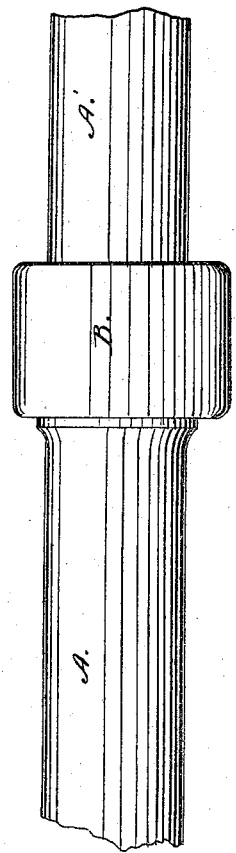
Figure 2:
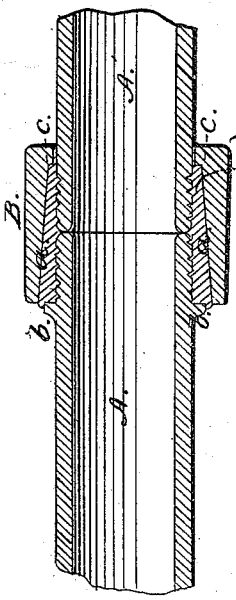

Figure 1 is an elevation of the adjoining extremities of two pipes connected in the manner invented by me; and Fig. 2 is a vertical longitudinal section of the same through the center of the pipes.

The nature of my invention consists in enveloping the abutting ends of two pipes with a belt of some soft substance and forcing over it a sleeve of some harder substance; by forcing the harder sleeve over the soft substance, the latter is compressed against the pipes thus forming a durable and tight fastening.

In the drawing, A, A', represent the adjoining extremities of two pipes; a short sleeve of lead *a a* is shoved over the seam and kept in position by a ring shoulder *b* cast on to one of the pipes A; the lead sleeve should have a conical exterior and the outer surface of the extremities of each pipe should be grooved as represented in the drawing.

The outer sleeve, B, (made in this example of cast-iron) has a conical interior corresponding with the exterior of the lead sleeve, and a flange *c, c*, at the end opposite the corresponding ring shoulder *b* of the pipe A. The exterior of the lead sleeve should be larger than the interior of the iron sleeve so that when the latter is forced over the former it shall compress the yielding lead into all indentations on the surface of the pipes, while the lead is prevented from being squeezed out by the ring shoulder (*b*) on the pipe and the corresponding flange (*c*) on the sleeve.

I have thus far described the inner sleeve as being made of lead and the outer one as made of cast-iron, these substances having been employed by me and found fully to answer the purpose; but it is obvious that other substances posessing the same relative properties may be substituted in place of these two without affecting the principle of my invention. I have likewise described the outer sleeve as having a conical interior, but, when the belt is very soft and plastic, the outer sleeve may have a cylindrical interior and the flange *c* fitting closely to the exterior of the pipe will compress the soft substance sufficiently to form a tight and firm joint.

The projecting shoulder *a* on the pipe may be dispensed with and the soft belt be prevented from escaping at that end of the sleeve by a temporary stop or grip, which may be removed from the pipe as soon as the connection is made, and used in fastening the next joint.

The advantages of this mode of fastening pipes are: first, its cheapness, which adapts it to all descriptions of pipe; second, in lead joints it not only obviates the loss of time and trouble in running melted lead into the joint and the after process of calking, but actually makes a better joint; third, the advantage it gives of replacing a damaged pipe or of introducing a branch in a line of pipes already laid, as the iron sleeve can be forced backward and the lead removed, a new pipe or a branch can then be inserted and the new joints made as perfect as those first made; and fourth, it affords great facilities for laying pipes under water, as the joints can be easily and quickly made in such situations.

What I claim as my invention and desire to secure by Letters Patent is—

Fastening together the abutting ends of two pipes by forcing a sleeve of some hard substance over a belt of a softer substance which envelops the seam and is thus compressed between the sleeve and the pipes.

CHAPMAN WARNER.

Witnesses:
P. H. WATSON,
E. T. RENNICK.